United States Patent [19]

Soya et al.

[11] Patent Number: 5,677,723
[45] Date of Patent: Oct. 14, 1997

[54] LASER SCANNER CONTROL CIRCUIT WHICH IS USED IN IMAGE FORMING APPARATUS AND DRIVER IC FOR USE IN SUCH A CIRCUIT

[75] Inventors: Takashi Soya; Takashi Nakahara, both of Kawasaki; Akihiro Shibata, Yokohama; Hidenobu Suzuki, Kawasaki, all of Japan

[73] Assignee: Canon Kabushiki Kaisha, Tokyo, Japan

[21] Appl. No.: 571,552

[22] Filed: Dec. 13, 1995

Related U.S. Application Data

[62] Division of Ser. No. 857,507, Mar. 25, 1992, Pat. No. 5,504,517.

[30] Foreign Application Priority Data

Apr. 4, 1991 [JP] Japan ..................... 3-71699
Apr. 4, 1991 [JP] Japan ..................... 3-71701

[51] Int. Cl.⁶ ............................................. B41J 2/47
[52] U.S. Cl. ........................................ 347/247; 347/246
[58] Field of Search .................... 347/239, 248, 347/247, 249, 234, 235, 250

[56] References Cited

U.S. PATENT DOCUMENTS

| | | | |
|---|---|---|---|
| 4,201,994 | 5/1980 | Hoshito et al. | 347/247 |
| 4,620,200 | 10/1986 | Fukai | 346/108 |
| 4,704,698 | 11/1987 | Reiniger | 347/248 |
| 4,727,382 | 2/1988 | Negishi et al. | 346/108 |
| 4,734,715 | 3/1988 | Shiraishi | 346/108 |
| 4,761,659 | 8/1988 | Negishi | 346/108 |
| 4,862,289 | 8/1989 | Shimada | 346/108 X |
| 4,908,634 | 3/1990 | Arimoto et al. | 346/108 |
| 4,910,532 | 3/1990 | Hiroguchi | 346/108 |
| 4,990,763 | 2/1991 | Shinada | 250/205 |
| 5,083,140 | 1/1992 | Peterson et al. | 346/108 X |
| 5,241,330 | 8/1993 | Kawabata et al. | 346/108 |
| 5,296,942 | 3/1994 | Shiun | 358/298 |

FOREIGN PATENT DOCUMENTS

| | | |
|---|---|---|
| 3618031 | 1/1987 | Germany . |
| 58-106622 | 6/1983 | Japan . |
| 59-067772 | 4/1984 | Japan . |
| 2229833 | 10/1990 | United Kingdom . |

*Primary Examiner*—Mark J. Reinhart
*Attorney, Agent, or Firm*—Fitzpatrick, Cella, Harper & Scinto

[57] ABSTRACT

A laser scanner control circuit which is used for an apparatus for scanning onto a photo sensitive material by a laser beam and forming and image thereon is constructed as a monolithic driver IC onto a single chip. A reset circuit is provided for a sample-hold circuit so as to minimize the laser power when the image forming apparatus is in a standby mode. A circuit to detect an abnormality of the laser power is further provided. Due to this, the safety of the laser power control of the sample-hold circuit is improved. The operation of the sample-hold circuit can be started at a time point when the laser emitting operation is stable.

28 Claims, 7 Drawing Sheets

LASER SCANNER CONTROL CIRCUIT WHICH IS USED IN IMAGE FORMING APPARATUS AND DRIVER IC FOR USE IN SUCH A CIRCUIT

This application is a division of application Ser. No. 07/857,507 filed Mar. 25, 1992 U.S. Pat. No. 5,504,517, allowed.

BACKGROUND OF THE INVENTION

1. Field of the Invention

The invention relates to a laser drive circuit and a scanner drive circuit for a laser scanner control circuit which is used in an apparatus for scanning on a photo sensitive material by a laser beam and forming an image onto the photo sensitive material.

The invention relates to a monolithic driver IC in which the above laser scanner control circuit is formed on a single chip.

2. Related Background Art

In an image forming apparatus such as a laser printer or the like for scanning on a photo sensitive material by a laser beam and forming an image onto the photo sensitive material, a laser drive circuit to drive a laser and a polygon motor drive circuit are formed on different chips. As part of the laser drive circuit, a laser power control circuit controls laser power by logic or CPU control, or the like, and uses circuitry such as an A/D converter, a D/A converter, etc.

In a laser printer in which a print density can be switched, there is a case where a rotational speed of a polygon motor (scanner motor) must be changed and a laser beam power must be also changed in accordance with a set print density.

Therefore, a conventional laser scanner control circuit uses a two-signal construction in which a rotational speed control signal is received and the rotational speed of the scanner motor is changed and in which a laser beam power control signal is received and the laser beam power is changed, thereby to adjust the scanning speed of the laser and the laser beam power in accordance with the print density.

However, the rotational speed control signal and the laser beam power control signal are given independently, so that there occurs a problem such that the number of input lines increases and input circuitry becomes complicated.

In addition, it is necessary to respectively supply the optimum signals according to the print density to a control circuit to generate the above two signals. It is difficult to optimize such signals unless characteristics of a printer engine have been stored.

Since both a digital logic section and an analog control section exist in the laser drive circuit, when the polygon motor drive circuit comprising a bipolar device and the laser drive circuit are formed on the same chip, it is necessary to construct the logic section by an IIL or to construct the logic section by a CMOS device and to construct the analog section by a bipolar device by using a BiCMOS process (process to form a circuit in which a bipolar device and a CMOS device mixedly exist).

When an IIL is used, therefore, there occurs a problem such that the laser power cannot be controlled at a high speed due to a frequency response of the IIL. When the BiCMOS process is used, there occur problems such that the manufacturing costs are high and the IC becomes expensive.

When the laser drive circuit and the polygon motor drive circuit are formed on the same chip, heat loss of each driver occurs on the same chip, so that there also occurs a problem such that a temperature of the chip rises.

SUMMARY OF THE INVENTION

It is an object of the present invention to address the foregoing technical problems.

Another object of the invention is to provide an image forming apparatus which can change a print density and whose construction can be simplified without deteriorating print quality.

According to the invention, by controlling a laser beam power on the basis of rotational speed control information of a scanner motor, the optimum laser beam power according to a print density can always be set, the number of control signals which are sent from a printer engine controller is also reduced, and a recording apparatus can be simplified.

Still another object of the invention is to lower the costs of an image forming apparatus.

According to the invention, since a laser power control circuit of a laser drive circuit is constructed by a sample and hold circuit, the laser drive circuit can be constructed by only bipolar devices. Consequently, the laser drive circuit can be formed on the same chip as that of a polygon motor drive circuit comprising a bipolar device and the low costs can be realized.

Further another object of the invention is to solve various inconveniences occurring when the laser drive circuit and the polygon motor circuit are formed on the same chip.

According to the invention, a reset circuit is provided for the sample and hold circuit so as to minimize the laser power when the image forming apparatus is in a standby mode and, further, there is provided a laser power abnormality detection circuit to detect that the laser power is abnormal. Therefore, the safety of the laser power control in the sample and hold circuit is improved. Further, an erroneous sampling can be prevented by starting the sampling operation of the sample and hold circuit at a time point when the laser is turned on and the detection of the laser power is stabilized.

According to the invention, by installing a monolithic driver IC of the invention onto a metal circuit board to construct a polygon motor, an increase in temperature of the chip can be suppressed by reducing a thermal resistance of a junction portion of the IC and its peripheral portion.

The above and other objects, features and advantages of the present invention will become apparent from the following detailed description and the appended claims with reference to the accompanying drawings.

DETAILED DESCRIPTION OF THE PREFERRED EMBODIMENTS

Preferred embodiments of the present invention will be described hereinbelow with reference to the drawings.

[Embodiment 1]

Figure 1:
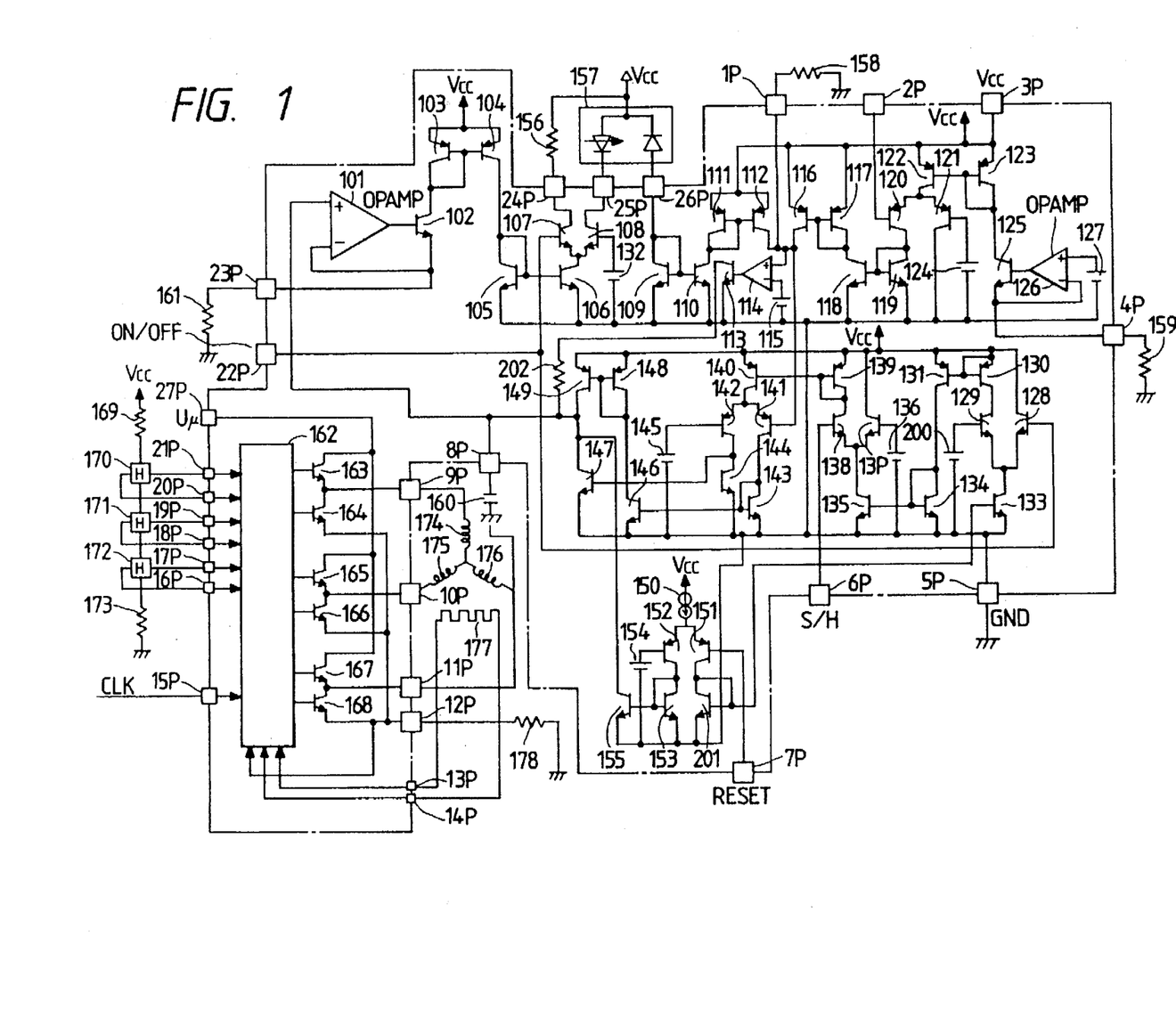
FIG. 1 is a circuit diagram of a monolithic driver IC of the first embodiment of the invention.

FIG. 1 shows a laser scanner control circuit constructed by a monolithic driver IC according to the first embodiment of the invention.

A laser diode 157 comprises: a laser diode chip connected to a pin 25P; and a photo diode which is connected to a in 26P and is used to detect a laser power. The laser diode chip is turned on or off by transistors 108 and 107. When a voltage of a pin 22P to turn on/off the laser is lower than a reference voltage 132 at a base of the transistor 108, the transistor 107 is turned off and the transistor 108 is turned on. Thus, a current flows in the laser diode chip. The current is controlled by a transistor 106. The transistor 106 constructs a current mirror together with a transistor 105. The transistor 104 constructs a current mirror together with a transistor 103.

A collector current flowing in the transistor 103 is controlled by a voltage on the non-inverting side of an operational amplifier 101 by the operational amplifier 101, a transistor 102, and an externally connected resistor 161 which is attached to a pin 23P.

Therefore, a current to the laser diode chip is controlled by the voltage on the non-inverting side of the operational amplifier 101.

When a voltage at the pin 22P for laser ON/OFF is higher than the reference voltage 132, the transistor 108 is turned off and the transistor 107 is turned on. Thus, a current flows in a resistor 156 attached to a pin 24P. The resistor 156 is provided to prevent an increase in temperature of the IC. When the voltage at the pin 22P to turn on/off the laser is lower or higher than the reference voltage 132 on the base side of the transistor 108 by about one volt, the laser is turned on/off. When such a voltage largely fluctuates, a collector voltage of the transistor 106 largely fluctuates at a change time point of the laser on/off operation, so that an adverse influence is exerted on the switching characteristics of the laser.

When the laser is ON, the laser power is detected by the current flowing in a photodiode. The current flows into a transistor 109 and becomes a collector current of a transistor 110 which constructs a current mirror together with the transistor 109. Transistors 111 and 112 also construct a current mirror. The photodiode current appears as a collector current of the transistor 112.

The above collector current flows into a resistor 158 externally connected to a pin 1P and is converted into the voltage by a the resistor 158.

The above voltage is applied to a base of a transistor 141.

Since the transistor 141 constructs a differential amplifier together with a transistor 142, a reference voltage 145 on the base side of the transistor 142 is compared with the foregoing voltage. When the above voltage is higher than the reference voltage 145, the current on the side of the transistor 142 increases. Consequently, the current on the side of a transistor 144 flows larger than a current of a transistor 143. Further, a current of a transistor 147 constructing a current mirror together with the transistor 144 flows larger than a current of a transistor 146 constructing a current mirror together with the transistor 143 and, further, a current of a transistor 149 constructing a current mirror together with a transistor 148. Thus, a capacitor 160 which is externally connected to a pin 8P is discharged, thereby reducing a voltage across the capacitor 160. Due to this, a voltage on the non-inverting side of the operational amplifier 101 decreases, thereby reducing a current of the laser diode chip.

On the contrary, when the voltage across the resistor 158 is lower than the reference voltage 145, the current of the transistor 149 increases and the current of the transistor 147 decreases. Therefore, the capacitor 160 is charged and the voltage across the capacitor 160 rises. Thus, the voltage on the non-inverting side of the operational amplifier rises, thereby increasing the current of the laser diode chip.

When the voltage across the resistor 158 is equal to the reference voltage 145, the current flowing in the transistor 149 and the current flowing in the transistor 147 are equal, so that the voltage across the capacitor 160 doesn't fluctuate.

On the other hand, a transistor 140 functions as a constant current source of the differential amplifying circuit comprising the transistors 142 and 141 mentioned above.

The transistor 140 forms a current mirror together with a transistor 139. A current flowing into the transistor 139 can be turned on/off by transistors 138 and 137. When a voltage higher than a reference voltage 136 on the base side of the transistor 137 is applied to a pin 6P for sampling and holding, the transistor 138 is turned on, a current flows into the transistor 139, the transistors 142 and 141 operate as mentioned above, and the sampling operation is executed.

On the other hand, when a voltage lower than the reference voltage 136 is applied to the pin 6P for sampling and holding, the transistor 138 is turned off and no current flows to the transistors 142 and 141, so that the holding operation is performed.

A transistor 135 forms a current mirror together with a transistor 134. A transistor 131 forms a current mirror together with a transistor 130.

A current flowing into the transistor 130 is turned on/off by transistors 128 and 129.

A reference voltage 200 which is slightly lower than the reference voltage 132 at a base of the transistor 108 to turn on/off the laser is applied to a base of the transistor 129. The pin 22P to turn on/off the laser is connected to a base of the transistor 128.

That is, when the pin 22P to turn on/off the laser is set to the laser turn-on mode, a sequence such that the transistor 108 is first turned on and the transistor 129 is subsequently turned on is started. That is, after the laser was turned on, the sample and hold circuit operates.

From the above description, it will be understood that a current of the sample and hold circuit is decided by the current of a transistor 133.

A collector current of a transistor 116 also flows into the resistor 158 connected to the pin 1P.

The transistor 116 forms a current mirror together with a transistor 117.

A transistor 118 forms a current mirror together with a transistor 119.

When a voltage lower than a reference voltage 124 connected to the base side of a transistor 121 is applied to a pin 2P, a transistor 120 is turned on, so that a current flows into the transistor 119. When a voltage higher than the reference voltage 124 is applied to the in 2P, the transistor 121 is turned on and the transistor 120 is turned off, so that no current flows into the transistor 119.

A transistor 122 forms a current mirror together with a transistor 123. A collector current of the transistor 123 is determined by an operational amplifier 126, a reference voltage 127, a transistor 125, and a resistor 159 connected to a pin 4P. Namely, a collector current of the transistor 116 is decided by the resistor 159.

When a current flows into the transistor 116, a voltage across the resistor 158 rises, resulting in that a large laser power is apparently generated. Therefore, the laser power is reduced.

In other words, the laser power can be switched by the pin 2P and a fluctuation width of the switching power can be determined by the resistor 159.

The voltage across the resistor 158 is compared with a reference voltage 115 by a comparator 114. When the voltage is higher than the reference voltage 115, a transistor 113 is turned on and the capacitor connected to the pin 8P is discharged through a resistor 202. Thus, when the laser power is equal to or larger than a predetermined value, the laser is turned off to thereby prevent a breakdown of the laser.

A reset pin 7P is also provided. When a voltage at the pin 7P is higher than a reference voltage 154, a transistor 152 is turned on and a transistor 151 is turned off. Thus, no current flows into a transistor 201. No current also flows into the transistor 133 constructing a current mirror together with the transistor 201. Namely, as mentioned above, no current flows into the sample and hold circuit and the sample and hold circuit doesn't operate.

A current of a current source 150 flows into a transistor 153 and the same current flows into a transistor 155 constructing a current mirror together with the transistor 153.

Thus, a voltage of a non-inverting terminal of the operational amplifier 101 is set to the GND level and no laser power is generated.

A hall motor controller 162 and driver transistors 163, 164, 165, 166, 167, and 168 are constructed on the same chip by bipolar devices. Resistors 169 and 173 determine currents flowing into Hall elements 170, 171, and 172. The Hall elements 170, 171, and 172 detect the position of a rotor of a motor and supply a detection voltage to pins 17P, 18P, 19P, 20P, and 21P.

The Hall motor controller 162 determines the proper drive transistor on the basis of the rotor position information from the Hall elements 170, 171, and 172 and supplies currents to stator coils 174, 175, and 176 connected to pins 9P, 10P, and 11P.

A rotational speed of the rotor is detected by a tachogenerator 177 and supplied to pins 13P and 14P. The speed information of the tachogenerator 177 is compared with a reference clock CLK which is supplied to a pin 15P and controls a current which is supplied to the motor. The rotational speed of the rotor is controlled to a value based on the fundamental clock of the pin 15P. A resistor 178 is connected to a pin 12P and is provided to detect the currents of the stator coils.

Figure 2:
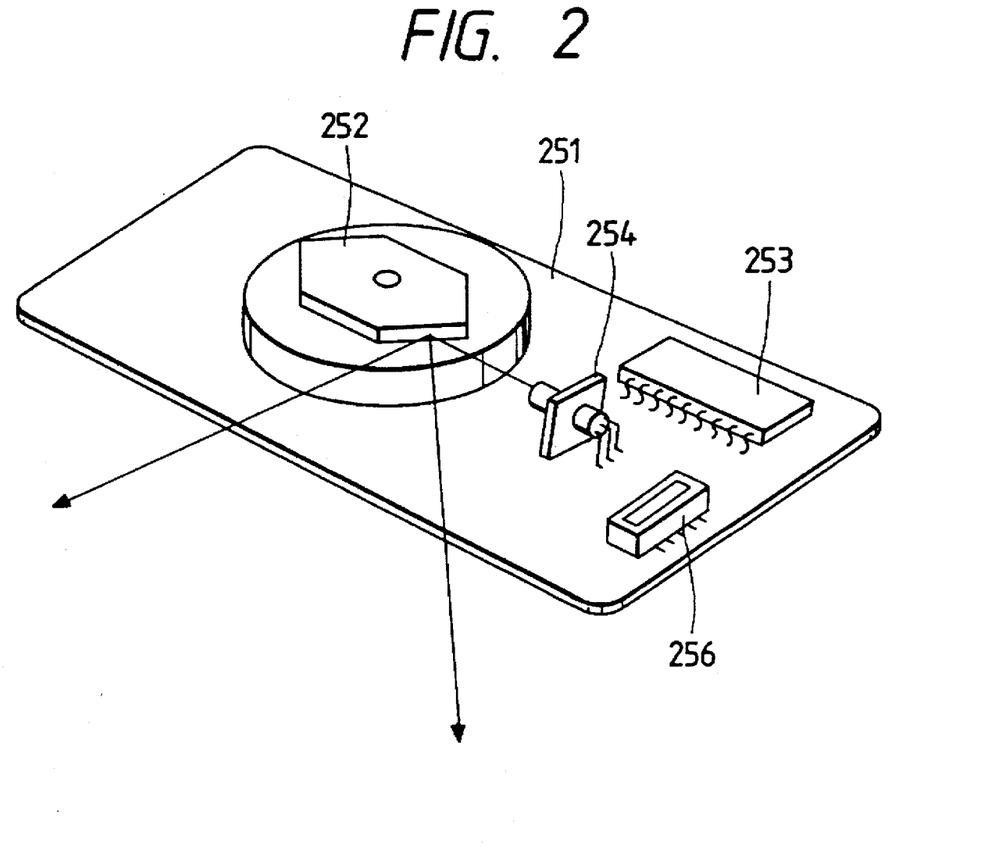
FIG. 2 is an installation diagram of the monolithic driver IC of the invention.

As shown in FIG. 2, a foregoing monolithic driver IC 253 is installed together with a laser 254 and a connector 256 onto an iron board 251 constructing a polygon motor. Reference numeral 252 denotes a polygon mirror.

A pin 3P is used for a power source voltage for a laser control, a pin 5P is used for a GND level, and a pin 27P is used for a power source voltage for the polygon motor.

[Embodiment 2]

Figure 3:
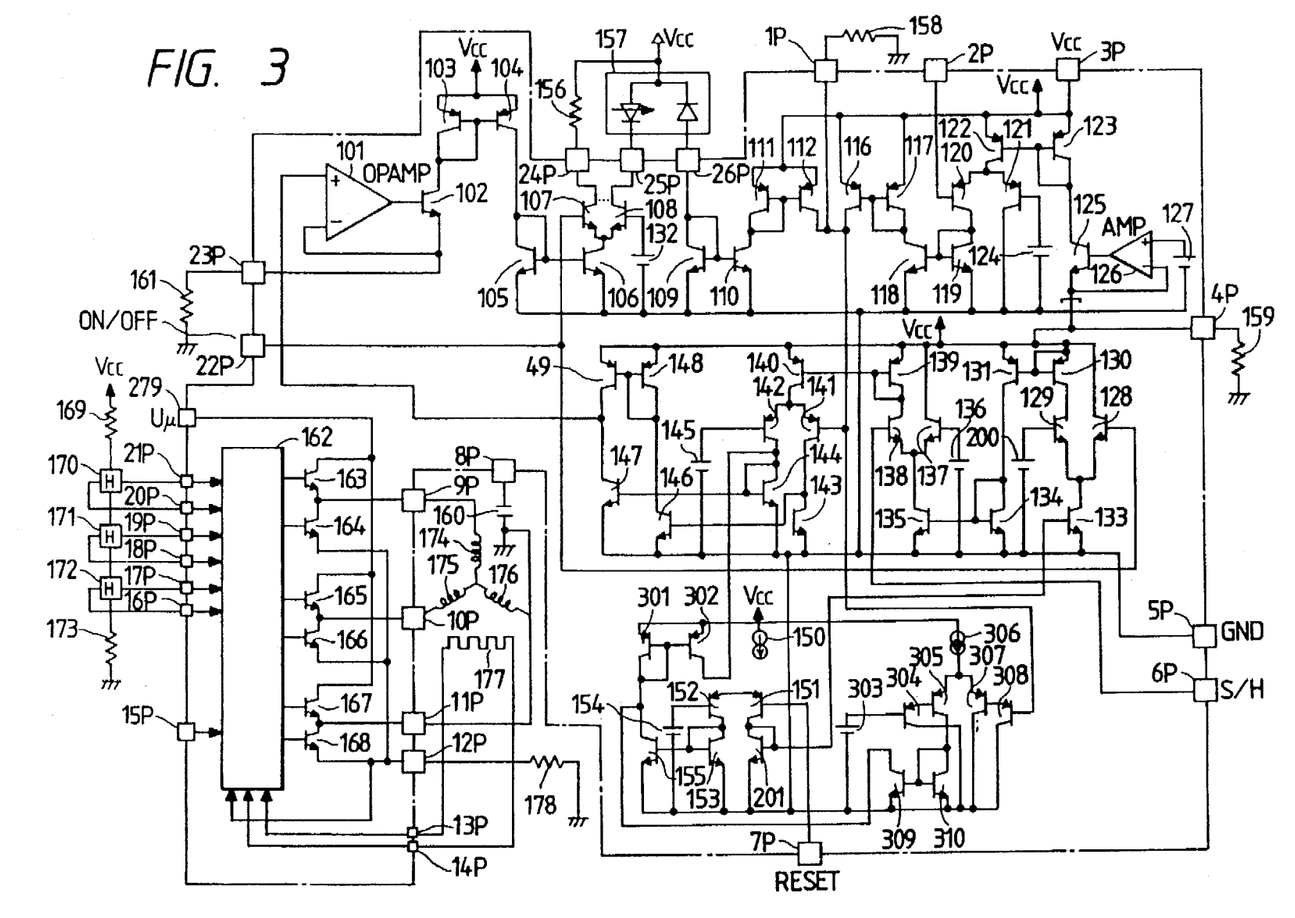
FIG. 3 is a circuit diagram of a monolithic driver IC of the second embodiment of the invention.

FIG. 3 is a circuit diagram showing the second embodiment of the invention.

In FIG. 3, the same component elements as those shown in the first embodiment of FIG. 1 are designated by the same reference numerals and their descriptions are omitted here. The second embodiment differs from the first embodiment with respect to points regarding a reset circuit and a laser power abnormality detection circuit.

In the first embodiment, a transistor of the reset circuit and a transistor to detect the abnormality are connected to the pin 8P of the capacitor for sampling and holding. In this case, when a holding time is extremely long, there is a fear such that an influence by leakage currents of the collector and base of the transistor increases. In the second embodiment, the holding time can be set to a long time and the influence by the leakage currents of the collector and base of the transistor can be reduced.

In the reset circuit, the operations up to the transistor 155 are substantially the same as those in the first embodiment.

That is, when the collector current flows into the transistor 155, a collector current flows into a transistor 301. A current flows to a collector of a transistor 302 constructing a current mirror together with the transistor 301. Due to this, as described in the first embodiment, since the transistor 140 is OFF, a current flows into the transistor 144, a current further flows into the transistor 147, and the capacitor is discharged, thereby setting the circuit into a reset state in a manner similar to the first embodiment. In the laser power abnormality detection circuit, the voltage across the resistor 158 is compared with a reference voltage 303 by transistors 304, 305, 307, and 308. When the voltage is higher than the reference voltage 303, a current of a current source 306 flows into a transistor 310 and to a transistor 309 constructing a current mirror together with the transistor 310, so that a current is supplied to the transistor 301. After that, the operations are executed in a manner similar to those of the reset circuit.

A monolithic driver IC in the above second embodiment is also installed as shown in FIG. 2.

[Embodiment 3]

Figure 4:
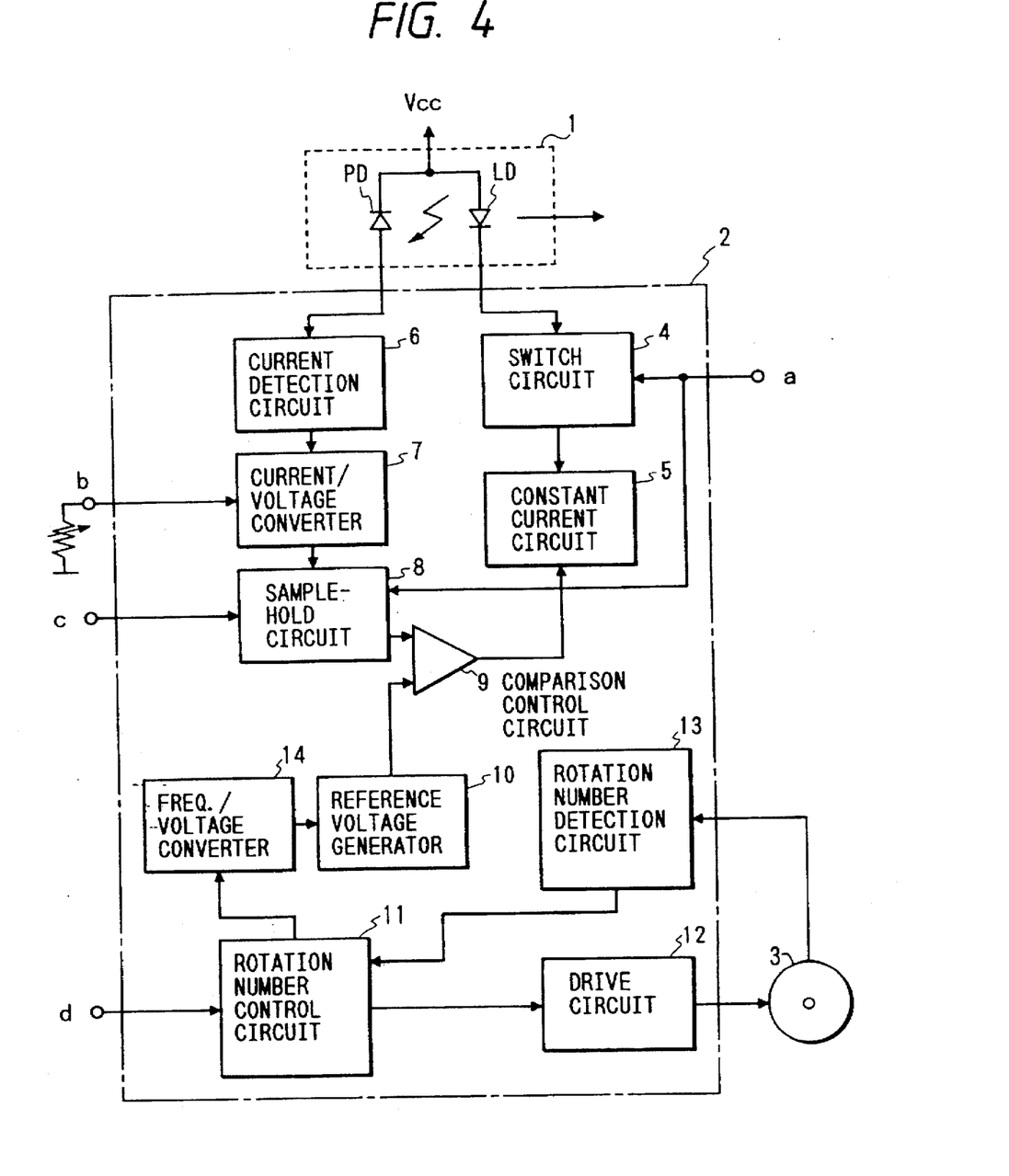
FIG. 4 is a block diagram showing the third embodiment of the invention.
Figure 5:
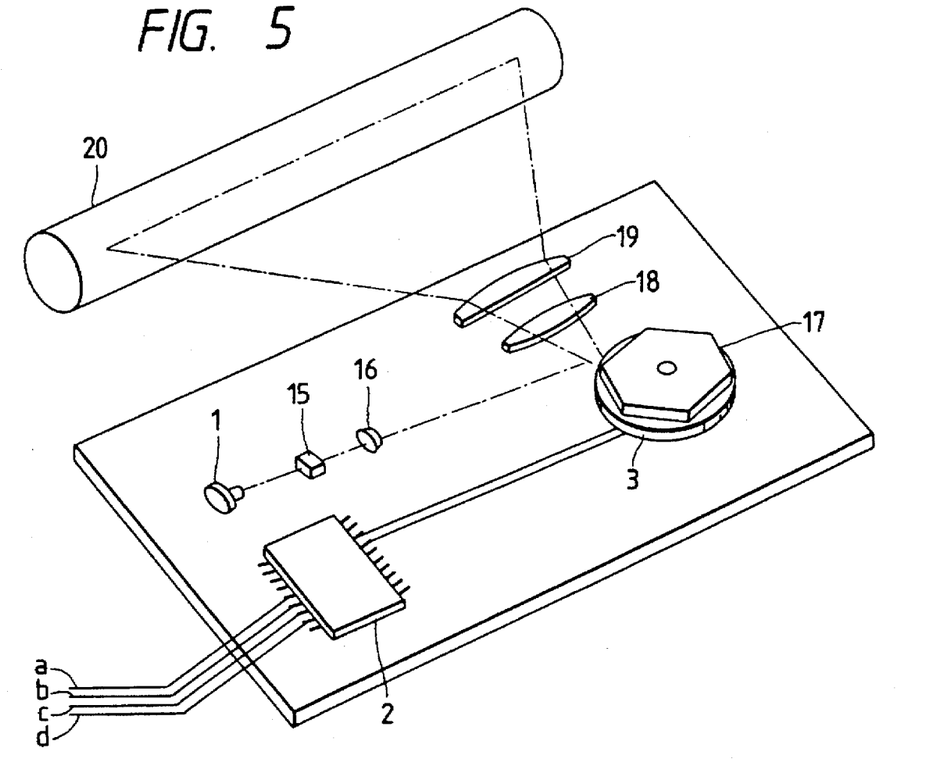
FIG. 5 is a schematic diagram showing the third embodiment of the invention.

FIGS. 4 and 5 show the third embodiment of the invention. FIG. 4 is a block diagram of a laser scanner control section of a laser recording apparatus. FIG. 5 is a schematic diagram showing a laser scanner unit of an electrostatic photography recording apparatus for exposing a laser beam onto a photo sensitive material and forming an image thereon. In FIG. 4, reference numeral 1 denotes a semiconductor laser unit having a laser diode LD and a photodiode PD to detect a light amount of the laser diode. Reference numeral 2 denotes a laser scanner control section to control the driving of the laser diode and the polygon scanner motor; 3 a scanner motor for rotating a polygon mirror and scanning a laser beam; 4 a switch circuit to turn on or off a current flowing in the laser diode LD on the basis of a control signal a; 5 a constant current circuit to make constant the current flowing when the laser diode LD is turned on; 6 a current detection circuit to detect a current flowing in the photodiode PD; 7 a current/voltage converter to convert the current detected by the current detection circuit 6 into the voltage by a predetermined magnification based on a control signal b; 8 a sample-hold circuit to sample or hold the output voltage of the current/voltage converter 7 on the basis of an external control signal c; and 9 a comparison control circuit for comparing an output voltage of the sample-hold circuit 8 and an output voltage of a reference voltage generator 10 and for controlling a constant current value which is set by the constant current circuit 5. Reference numeral 11 denotes a rotational speed control circuit to control a rotational speed of the scanner motor 3 on the basis of an external control clock signal d; 12 a drive circuit to supply a current to the scanner motor 3 on the basis of an output signal of the rotational speed control circuit 11; and 13 a rotational speed detection circuit to detect the rotational speed of the scanner motor 3. The detection circuit 13 feeds back the rotational speed information to the control circuit 11, thereby keeping the rotational speed of the scanner motor 3 constant. Reference numeral 14 denotes a frequency/voltage converter to convert a clock frequency of the external control clock signal d into a voltage.

In FIG. 5, the same component elements as those shown in FIG. 4 are designated by the same reference numerals and their descriptions are omitted here. In FIG. 5, reference numeral 15 denotes a collimating lens to convert a laser beam from the semiconductor laser unit 1 into a parallel beam; 16 a cylindrical lens to converge the parallel beam in only one direction; and 17 a polygon mirror to scan the laser beam. The polygon mirror is rotated by the scanner motor 3. Reference numeral 18 denotes a toric lens and 19 an f-θ lens. The laser beam is transmitted through the lenses 18 and 19, so that a corresponding image is formed onto a photo sensitive drum 20. The control signals a, b, c, and d are connected to a printer engine control section (not shown).

An adjusting operation of the laser scanner control circuit 2 will now be described. A laser beam power on the drum 20 is first adjusted to a specified value. The control circuit 2 receives the control clock signal d according to the print density and decides a reference output voltage of the reference voltage generator 10 by the output voltage of the frequency/voltage converter 14 and supplies to the comparison control circuit 9. The sample-hold circuit 8 is set into the sampling mode by a control signal c.

The switch circuit 4 is turned on by the control signal a. The output voltage of the sample-hold circuit 8 is compared with the output voltage of the reference voltage generator and a control signal b (analog voltage value) of the current/voltage converter 7 is controlled so as to always equalize those output voltages, thereby controlling the current value of the constant current circuit 5.

A value of the control signal b is fixed at a time point when the laser beam power on the photo sensitive drum surface is equal to a specified laser power. Ordinarily, the control signal b is formed by using a semifixed volume or the like. In general, there is a proportional relation between a laser output of the laser diode LD and a photo current of the photodiode PD. By detecting the photo current of the photodiode PD, the laser beam output of the laser diode can be monitored.

When the switch circuit 4 is turned on by the above adjustment, the light emitting amount of the laser diode is always stabilized to a specified light amount.

Figure 6:
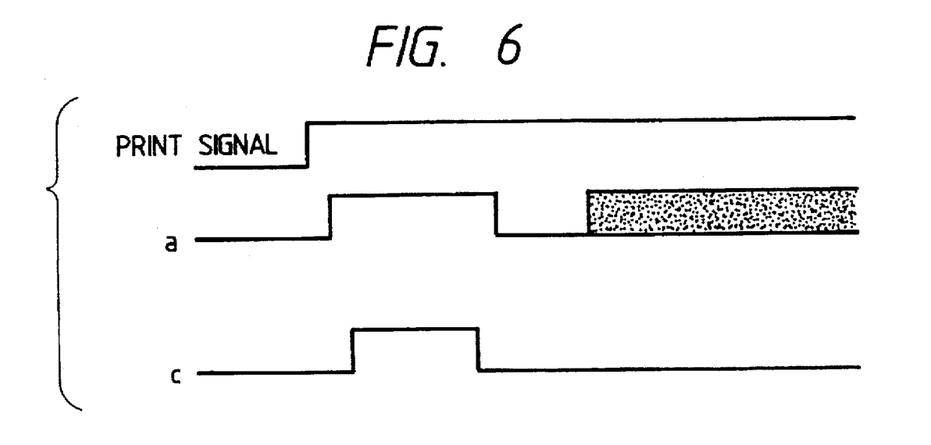
FIG. 6 is a timing chart showing the operation of the third embodiment of the invention.

The operation of the laser scanner control circuit 2 during the printing operation will now be described with reference to FIG. 6. When the printer engine control section receives a print signal, it generates the clock signal d according to the print density. The switch circuit 4 is turned on by the signal a. The sample-hold circuit 8 is set into the sampling mode by the signal c. The current value of the constant current circuit 5 gradually increases and the laser beam power reaches a specified value.

After the laser beam power reached the specified value and became sufficiently stable, the input voltage of the sample-hold circuit 8 is held by the control signal c and supplied to the comparison control circuit 9.

The current value of the constant current circuit 5 is set by the comparison control circuit 9 so that the laser diode LD emits the laser beam of a specified laser power even when the switch circuit 4 is turned off by the signal a after that. The above operation is called an automatic power control (APC). After that, the switch circuit 4 is turned on or off by the signal a on the basis of the print information. Generally, when an image is formed onto the photo sensitive drum by raster scanning, the laser power is monitored by the photodiode PD so as to keep the laser power to the specified value every scan or every page. The voltage conversion value is sampled by the sample-hold circuit 8, thereby adjusting the laser current. A state of the turn-off of the laser diode can be mentioned as an inhibiting condition of the sampling operation of the sample-hold circuit 8. That is, when the sample-hold circuit starts the sampling operation in the off state of the laser diode, the photodiode PD doesn't detect the laser beam, so that the output of the sample-hold circuit 8 doesn't rise and the comparison control circuit 9 increases the current value of the constant current circuit 5 to the maximum current value. When the switch circuit 4 is turned on after that, an excessive current flows into the laser diode LD, so that there is a possibility of a breakdown. Therefore, there is used a construciton such that the sample-hold circuit 8 can execute the sampling operation only when the switch circuit 4 is ON. Namely, the sample-hold circuit is set into the sampling mode only when both of the signals a and c are ON.

The case where the print density is changed, for instance, the case where the print density rises will now be considered. It is assumed that the print density in the above example is set to 300 d.p.i. (dots per inch). When the print density rises to 600 d.p.i., the scanning speed is doubled and the clock frequency for print data is increased by four times. Since the scanning speed is doubled, the rotational speed of the scanner motor to scan is doubled and the frequency of the control clock signal d is also doubled. The output voltage of the frequency/voltage converter 14 also changes. The set value of the reference voltage generator changes due to the voltage value. The reference voltage value which is supplied to the comparison control circuit 9 changes. Assuming that the set value of the control signal b is fixed to the above value (300 d.p.i.), when the operation similar to the above APC operation is executed, the set value different from the laser emitting power in the case of the above print density of 300 d.p.i. is held. To efficiently improve the resolution when the print density is raised, it is generally better to set the laser emitting power to a value which is lower than that in the case of the print density of 300 d.p.i. When the print density rises from 300 d.p.i. to 600 d.p.i., a ratio at which the laser power is reduced from the power at 300 d.p.i. to the power at 600 d.p.i. is unconditionally determined according to a state of the electrostatic photographing process. According to the experimental values, a high efficient resolution was obtained in the case of the laser power at 600 d.p.i. which is lower than the laser power at 300 d.p.i. by about 25%. For convenience of the process of print data, the print density is more generally set to a discrete value such as 240 d.p.i., 300 d.p.i., 400 d.p.i., 600 d.p.i., or the like. In the above control construction, the laser emitting power can be also continuously controlled for the control clock frequency of the scanner rotational speed. However, the values of the laser powers corresponding to the discrete values of the print densities can be also previously set as various reference voltage values in the reference voltage generator 10. It is also possible to perform an inhibiting procedure to inhibit that the laser emits the laser beam when the scanner motor is not rotating or the rotational speed of the scanner motor doesn't reach a specified rotational speed.

[Embodiment 4]

Figure 7:
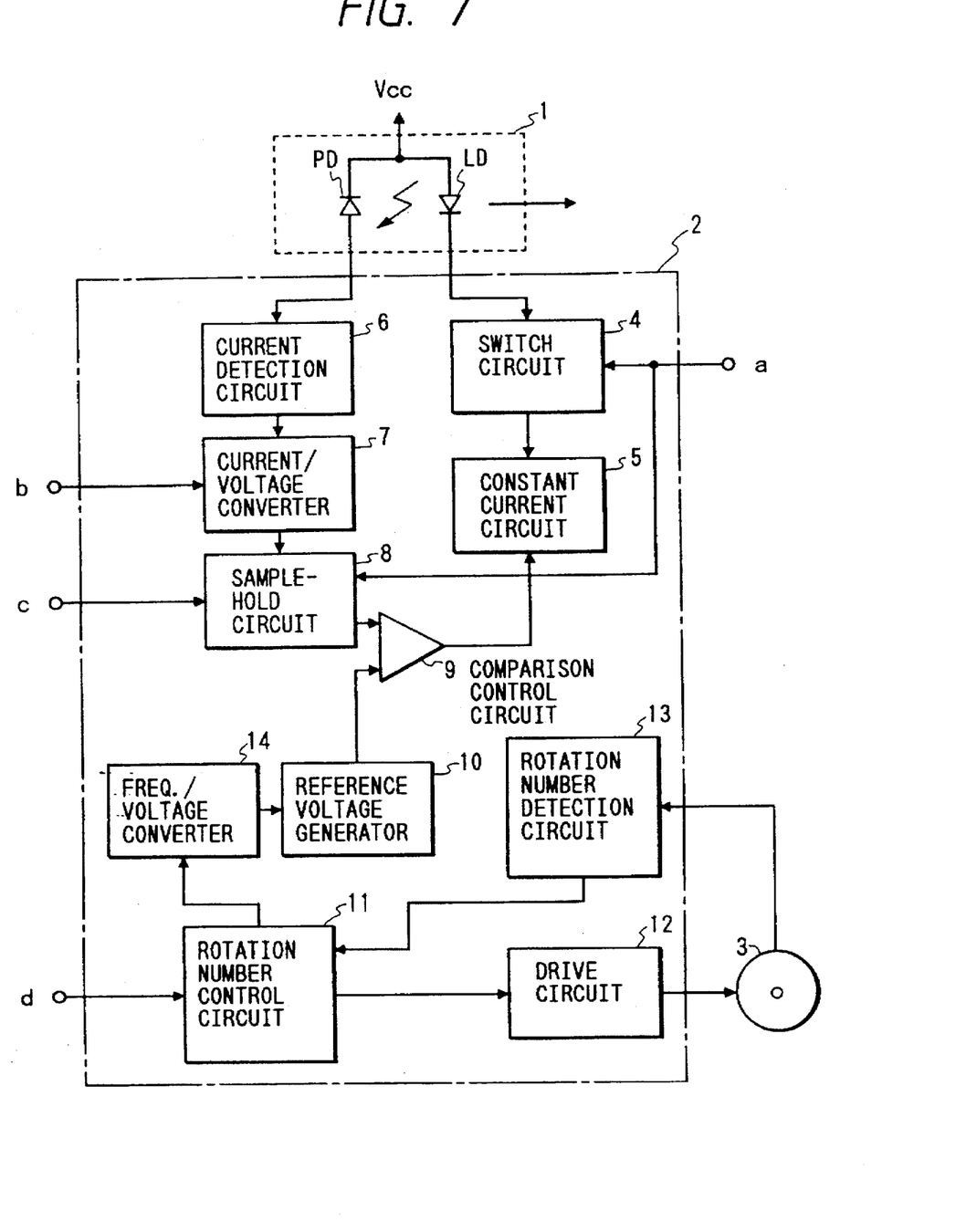
FIG. 7 is a block diagram showing the fourth embodiment of the invention.

FIG. 7 shows the fourth embodiment of the invention. In FIG. 7, the same component elements and signals as those shown in FIG. 4 are designated by the same reference numerals and their descriptions are omitted here.

The fourth embodiment differs from the first embodiment with respect to a point that the output of the frequency/voltage converter 14 to convert the frequency of the control clock signal d into the voltage is supplied to the current/voltage converter 7. The reference voltage generator 10 generates a predetermined reference voltage. In a manner similar to the first embodiment, the laser emitting power is adjusted to the value according to the print density of 300 d.p.i. The rotational speed information according to the rotational speed of the scanner motor is supplied to the current/voltage converter 7 through the frequency/voltage converter 14. A conversion ratio of the converter 7 is set in accordance with the value of such rotational speed information. The value of the control signal b is set by also including the rotational speed information.

When the print density is changed to 600 d.p.i., the output voltage value of the frequency/voltage converter also changes and the conversion ratio of the converter 7 changes. The APC is performed in a state in which the photo current value of the photodiode PD changes, thereby setting the laser emitting power to a value different from the laser power at the print density of 300 d.p.i.

Although an effect similar to that in the first embodiment is derived, since the voltage applied to the current/voltage converter 7 is adjusted by also including the rotational speed information of the scanner motor, the rotational speed of the scanner motor changes. That is, when the print density changes, the value of the signal b also changes. By reading the information (voltage value) of the signal b, the laser power can be monitored. When the laser recording apparatus is manufactured, the laser power can be easily checked.

[Embodiment 5]

Figure 8:
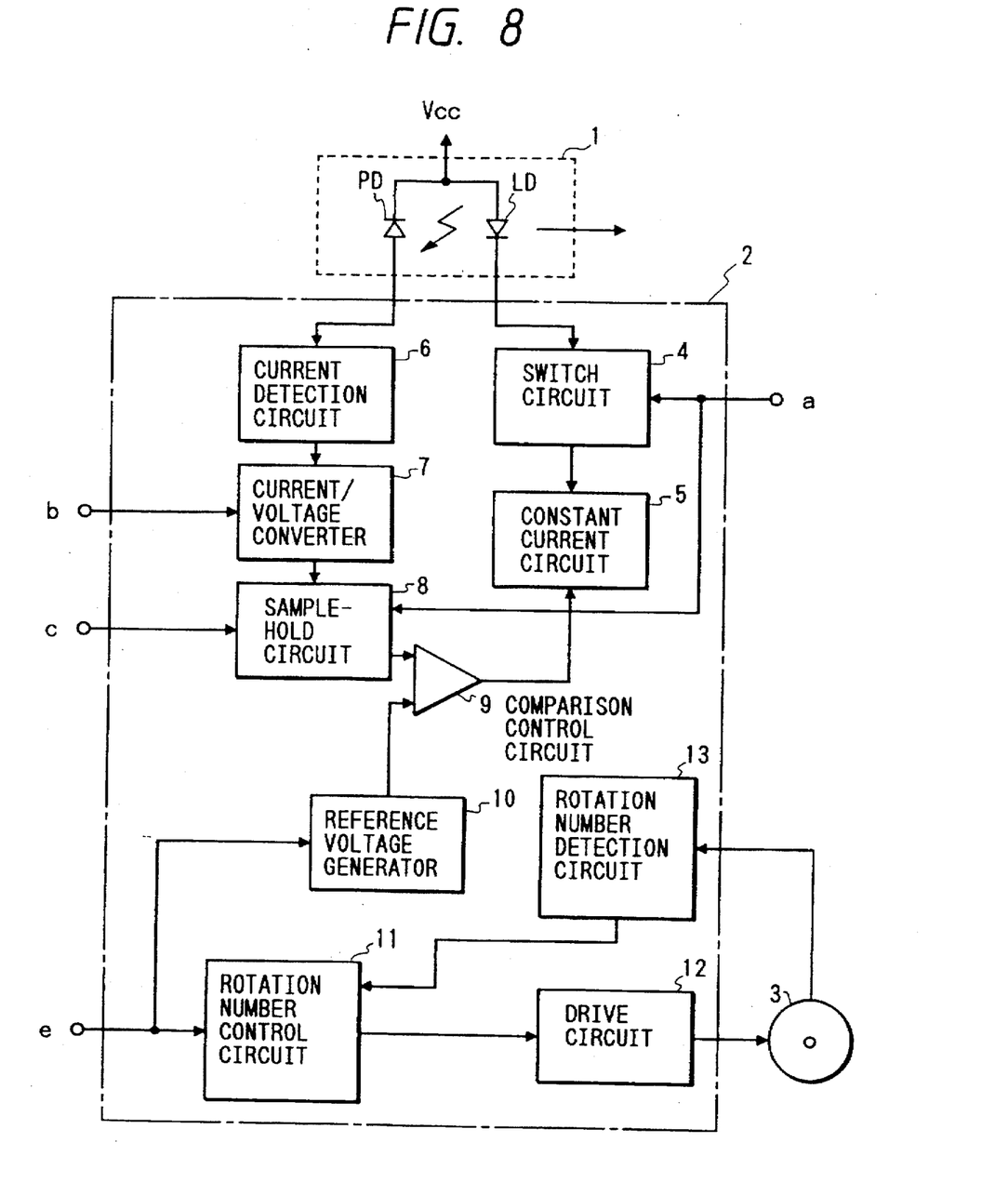
FIG. 8 is a block diagram showing the fifth embodiment of the invention.

FIG. 8 shows the fifth embodiment of the invention. In FIG. 8, the same component elements and signals as those shown in FIG. 7 are designated by the same reference numerals and their descriptions are omitted here.

Reference numeral 2 denotes a rotational speed control circuit including a control clock generator for a scanner motor rotation. The frequency of the control clock is switched by a control signal e in accordance with the print density. The output voltage value of the reference voltage generator 10 is switched in accordance with the information of the control signal e and the laser emitting power changes in a manner similar to the first embodiment. Different from the first embodiment, by providing a high-speed clock for a scanner rotational speed control into the control circuit 2, it is possible to easily take a countermeasure for the radiation noises or the like. In comparison between the first and second embodiments, the control signal e can be also supplied to the current/voltage converter 7.

As described above, by using the construction such as to control the laser power on the basis of the rotational speed control information of the scanner motor, the optimum laser power according to the print density can be easily set. The construction of the apparatus is simplified without adding a signal for a laser power change.

In the case where the scanner motor rotational speed control circuit and the laser scanner control circuit including the laser power control circuit are constructed by a monolithic IC, the above effect is further remarkable.

As described above, the laser power control circuit of the laser drive circuit is constructed by the sample-hold circuit, the laser drive circuit can be constructed by only the bipolar device, and the laser drive circuit can be formed on the same chip together with the polygon motor drive circuit constructed by the bipolar device. Consequently, the laser of low costs and the polygon motor driver can be realized by one chip. By providing the reset circuit so as to minimize the laser power in a state in which the image forming apparatus is in the standby mode and by further providing the laser power abnormality detection circuit to detect that the laser power is abnormal, the safety of the laser power control in the sample-hold circuit is improved.

Further, by starting the sampling operation of the sample-hold circuit at a time point when the laser is turned on and the detection of the laser power becomes stable, an erroneous sampling is prevented. Due to this, the reliability of the sample-hold system can be improved. By installing the monolithic driver IC of the invention onto the metal circuit board to form the polygon motor, the thermal resistances of the junction portion of the IC and its peripheral portions are reduced, a temperature increase of the chip is reduced, and the reliability can be improved.

The present invention is not limited to the foregoing embodiments but many modifications and variations are possible within the spirit and scope of the appended claims of the invention.

What is claimed is:

1. An image forming apparatus comprising:
   a sample-and-hold circuit for sampling and holding a signal representative of detected laser beam power; and
   a current control circuit for controlling current applied to a laser device so that the sampled-and-held signal is driven to a value corresponding to a target laser beam power,
   wherein a time difference is provided between a time when the laser device is turned on and a time when said sample-and-hold circuit is set into a sampling mode.

2. An apparatus according to claim 1, wherein said apparatus comprises a laser power circuit for variably setting the target laser power in accordance with a signal from a target laser power setting means.

3. An apparatus according to claim 1, wherein said sample-and-hold circuit is set into a sampling mode only when said current control circuit turns laser beam emission ON.

4. An apparatus according to claim 1, wherein said apparatus includes a reset circuit which resets the sampled-and-held signal in a case where said image forming apparatus is in a standby mode.

5. An apparatus according to claim 4, wherein when said reset circuit is in a resetting mode, said sample-and-hold circuit is set into a holding mode.

6. An apparatus according to claim 1, further comprising a motor drive circuit which drives a scanning motor for rotating a polygonal mirror to scan the laser beam onto a photosensitive surface, wherein at least said laser drive circuit and said motor drive circuit are constructed on a monolithic drive IC using a bipolar device.

7. An apparatus according to claim 4, wherein said monolithic driver IC is installed onto a metal board on which the scanning motor is mountable.

8. A monolithic driver IC comprising:
   a sample-and-hold circuit for sampling and holding a signal representative of detected laser beam power; and
   a current control circuit for controlling current applied to a laser device so that the sampled-and-held signal is driven to a value corresponding to a target laser beam power;
   wherein a time difference is provided between a time when the laser device is turned on and a time when said sample-and-hold circuit is set into a sampling mode.

9. A monolithic driver IC according to claim 8, wherein said monolithic driver IC comprises a laser power circuit for variably setting the target laser power in accordance with a signal from an external device.

10. A monolithic driver IC according to claim 8, wherein said sample-and-hold circuit is set into a sampling mode only when said current control circuit turns laser beam emission ON.

11. A monolithic driver IC according to claim 8, wherein said monolithic driver IC includes a reset circuit which resets the sampled-and-held signal.

12. A monolithic driver IC according to claim 11, wherein when said reset circuit is in a resetting mode, said sample-and-hold circuit is set into a holding mode.

13. A monolithic driver IC according to claim 8, further comprising a motor drive circuit which drives a scanning motor for rotating a polygonal mirror to scan the laser beam onto a photosensitive surface.

14. An image forming apparatus comprising:
   a sample-and-hold circuit for sampling and holding a signal representative of detected laser beam power;
   a current control circuit for controlling current applied to a laser device so that the sampled-and-held signal is driven to a value corresponding to a target laser beam power; and
   a laser power abnormality detection circuit which detects a laser power abnormality and which controls said sample-and-hold circuit on the basis of a detection of laser power abnormality.

15. An apparatus according to claim 14, wherein said apparatus comprises a laser power circuit for variably setting the target laser power in accordance with a signal from a target laser power setting means.

16. An apparatus according to claim 14, wherein said sample-and-hold circuit is set into a sampling mode only when said current control circuit turns a laser beam emission ON.

17. An apparatus according to claim 14, wherein a time difference is provided between the time when said laser device is turned on and the time when said sample-and-hold circuit is set into the sampling mode.

18. An apparatus according to claim 14, wherein said apparatus includes a reset circuit which resets the sampled-and-held signal in a case where said image forming apparatus is in a standby mode.

19. An apparatus according to claim 18, wherein when said reset circuit is in a resetting mode, said sample-and-hold circuit is set into a holding mode.

20. An apparatus according to claim 14, further comprising a motor drive circuit which drives a scanning motor for rotating a polygonal mirror to scan the laser beam onto a photosensitive surface, wherein at least said laser drive circuit and said motor drive circuit are constructed on a monolithic driver IC using a bipolar device.

21. An apparatus according to claim 20, wherein said monolithic driver IC is installed onto a metal board on which the scanning motor is mountable.

22. A monolithic driver IC comprising:
   a sample-and-hold circuit for sampling and holding a signal representative of detected laser beam power;
   a current control circuit for controlling current applied to a laser device so that the sampled-and-held signal is driven to a value corresponding to a target laser beam power; and
   a laser power abnormality detection circuit which detects a laser power abnormality and which controls said sample-and-hold circuit on the basis of a detection of laser power abnormality.

23. A monolithic driver IC according to claim 22, wherein said monolithic driver IC comprises a laser power circuit for variably setting the target laser power in accordance with a signal from an external device.

24. A monolithic driver IC according to claim 22, wherein said sample-and-hold circuit is set into a sampling mode only when said current control circuit turns laser beam emission ON.

25. A monolithic driver IC according to claim 22, wherein a time difference is provided between the time when said laser device is turned on and the time when said sample-and-hold circuit is set into the sampling mode.

26. A monolithic driver IC according to claim 22, wherein said monolithic driver IC includes a reset circuit which resets the sampled-and-held signal.

27. A monolithic driver IC according to claim 26, wherein when said reset circuit is in a resetting mode, said sample-and-hold circuit is set into a holding mode.

28. A monolithic driver IC according to claim 22, further comprising a motor drive circuit which drives a scanning motor for rotating a polygonal mirror to scan the laser beam onto a photosensitive surface.

* * * * *